(12) United States Patent
He et al.

(10) Patent No.: US 12,366,990 B2
(45) Date of Patent: Jul. 22, 2025

(54) DATA STORAGE METHOD TO SHORTEN A DATA ACCESS PATH

(71) Applicant: Huawei Technologies Co., Ltd., Shenzhen (CN)

(72) Inventors: Yi He, Chengdu (CN); Siwei Luo, Chengdu (CN); Tao Cheng, Shenzhen (CN); Li Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 17/503,876

(22) Filed: Oct. 18, 2021

(65) Prior Publication Data
US 2022/0035560 A1     Feb. 3, 2022

Related U.S. Application Data

(63) Continuation of application No. PCT/CN2020/114346, filed on Sep. 10, 2020.

(30) Foreign Application Priority Data

Sep. 18, 2019 (CN) .......................... 201910883665.4
Dec. 17, 2019 (CN) .......................... 201911302007.8

(51) Int. Cl.
    *G06F 3/06* (2006.01)
(52) U.S. Cl.
    CPC .......... *G06F 3/0655* (2013.01); *G06F 3/0604* (2013.01); *G06F 3/067* (2013.01)

(58) Field of Classification Search
    CPC ......... G06F 3/067; G06F 3/0659; G06F 3/061
    See application file for complete search history.

(56) References Cited

U.S. PATENT DOCUMENTS

| 9,244,623 | B1 | 1/2016 | Bent et al. |
| 2004/0186961 | A1 | 9/2004 | Kimura et al. |
| 2012/0159102 | A1 | 6/2012 | Kan |

(Continued)

FOREIGN PATENT DOCUMENTS

| CN | 101064649 A | 10/2007 |
| CN | 101252589 A | 8/2008 |

(Continued)

OTHER PUBLICATIONS

Wikipedia, Apache Hadoop, Dec. 29, 2017, [retrieved from internet Apr. 9, 2024][<URL:https://web.archive.org/web/20171229065754/https://en.wikipedia.org/wiki/Apache_Hadoop>] (Year: 2017).*

(Continued)

*Primary Examiner* — Hosain T Alam
*Assistant Examiner* — Nicholas A. Paperno
(74) *Attorney, Agent, or Firm* — Conley Rose, P.C.

(57) ABSTRACT

A storage system, a storage node, and a data storage method are provided. The storage system includes a plurality of computing nodes and a plurality of storage nodes, and each storage node includes a hard disk. A client writes to-be-stored data into a memory of a first computing node, and writes a log of the to-be-stored data into storage space corresponding to a first access address of a first storage node. This implements storage of the to-be-stored data.

20 Claims, 6 Drawing Sheets

(56) References Cited

U.S. PATENT DOCUMENTS

| | | | |
|---|---|---|---|
| 2014/0032595 A1* | 1/2014 | Makkar | G06F 16/25 |
| | | | 707/E17.044 |
| 2014/0344507 A1* | 11/2014 | Piggin | G06F 12/0246 |
| | | | 711/103 |
| 2015/0249618 A1 | 9/2015 | Golander | |
| 2016/0274795 A1 | 9/2016 | Fiske et al. | |
| 2016/0375775 A1 | 12/2016 | Manishi et al. | |
| 2017/0132271 A1* | 5/2017 | Jiao | G06F 12/0261 |
| 2017/0262228 A1 | 9/2017 | Kanno | |
| 2017/0286150 A1 | 10/2017 | Wang et al. | |
| 2018/0300083 A1* | 10/2018 | Volos | G06F 3/0656 |
| 2018/0307426 A1 | 10/2018 | Sakai et al. | |
| 2018/0309637 A1* | 10/2018 | Gill | H04L 41/145 |
| 2019/0212923 A1 | 7/2019 | Venkatesan et al. | |
| 2020/0285591 A1 | 9/2020 | Luo et al. | |

FOREIGN PATENT DOCUMENTS

| | | |
|---|---|---|
| CN | 105335168 A | 2/2016 |
| CN | 105681402 A | 6/2016 |
| CN | 106201338 A | 12/2016 |
| CN | 106484311 A | 3/2017 |
| CN | 107408074 A | 11/2017 |
| CN | 107704555 A | 2/2018 |
| CN | 108183966 A | 6/2018 |
| CN | 109144416 A | 1/2019 |
| CN | 110235098 A | 9/2019 |
| JP | 2004192482 A | 7/2004 |
| JP | 2004287476 A | 10/2004 |
| JP | 2017162068 A | 9/2017 |
| JP | 2017174302 A | 9/2017 |
| JP | 2018504692 A | 2/2018 |
| JP | 2018181190 A | 11/2018 |
| WO | 2011027775 A1 | 3/2011 |
| WO | 2016130301 A1 | 8/2016 |

OTHER PUBLICATIONS

Shugo Ogawa, "Low-overhead Storage Access Method Based on Device Off-loading," Information Processing Society of Japan, SIG Technical Report, System Architecture (ARC), Information Processing Society of Japan, Jul. 19, 2017, with an English abstract, 9 pages.

* cited by examiner

DATA STORAGE METHOD TO SHORTEN A DATA ACCESS PATH

CROSS-REFERENCE TO RELATED APPLICATION

This is a continuation of International Patent Application No. PCT/CN2020/114346 filed on Sep. 10, 2020, which claims priority to Chinese Patent Application No. 201911302007.8 filed on Dec. 17, 2019 and Chinese Patent Application No. 201910883665.4 filed on Sep. 18, 2019. All of the aforementioned patent applications are hereby incorporated by reference in their entireties.

TECHNICAL FIELD

This disclosure relates to the field of storage technologies, and in particular, to a storage system, a storage node, and a data storage method.

BACKGROUND

A storage system generally includes a plurality of storage nodes, and the storage nodes are interconnected through the Ethernet. Computing resources such as a processor and a memory are disposed on each storage node. The computing resources are used to perform operations such as space management, address translation, and data read/write. In addition, each storage node further includes several hard disks. The hard disks are used to store data, and user data from various applications are stored on these hard disks. However, in an existing storage system architecture, a storage node is invisible to an application. There is a storage service layer between a storage node and an application. The storage service layer is used to perform operations such as managing metadata of user data, providing a value-added service, and virtualizing physical space provided by a hard disk. Therefore, when the application triggers a data access request, the data access request needs to pass through the storage service layer and computing resources on the storage node to reach the hard disk. A path of the data access request is excessive long. As a result, data access takes a very long time.

SUMMARY

This disclosure provides a storage system, a storage node, and a data storage method, to shorten a data access path and increase a data access speed to some extent.

A first aspect of this disclosure provides a storage system, including a plurality of computing nodes and a plurality of storage nodes. Each computing node includes a memory, and each storage node includes one or more hard disks. A first computing node in the plurality of computing nodes is configured to receive a data write request sent by a client, where the data write request includes to-be-stored data related to an application. The first computing node writes the to-be-stored data into a memory of the first computing node. A first storage node in the plurality of storage nodes is configured to receive a first write instruction sent by the client, where the first write instruction includes a log of the to-be-stored data and an access address of a first storage object that is allocated by the first computing node to the log of the to-be-stored data. The first storage node parses the first write instruction to obtain the log of the to-be-stored data and the access address of the first storage object, and forwards the log of the to-be-stored data and the access address of the first storage object to a first hard disk included on the first storage node. The first hard disk writes, based on the access address of the first storage object, the log of the to-be-stored data into storage space corresponding to the first storage object.

According to the storage system provided in the first aspect, the client sends the to-be-stored data to the first computing node for storage, and sends the log of the to-be-stored data to the first storage node for storage. In this way, storage of the to-be-stored data is implemented. In addition, on the first storage node, the access address of the first storage object does not need to be translated into another address, and instead, the access address of the first storage object is directly forwarded to the first hard disk, and the first hard disk stores the log based on the access address of the first storage object. In comparison with the conventional technology, a data access path is shortened because an address does not need to be translated.

Optionally, the client is deployed on a host, and communication between the host and the first computing node and communication between the host and the first storage node are performed through a network. In this case, that the first computing node receives the data write request sent by the client means that a network interface card of the first computing node receives the data write request sent by a network interface card of the host. That the first storage node receives the first write instruction sent by the client means that a network interface card of the first storage node receives the first write instruction sent by the network interface card of the host.

Optionally, the client is deployed on the first computing node. In this case, that the first computing node receives the data write request sent by the client means that a processor of the first computing node receives the data write request sent by the client through a bus. That the first storage node receives the first write instruction sent by the client means that a network interface card of the first storage node receives the first write instruction sent by a network interface card of the first computing node.

Optionally, the first computing node is further configured to allocate the first storage object to the log of the to-be-stored data after receiving the data write request sent by the client, where the access address of the first storage object includes an identifier of the first storage object and an offset of the first storage object. The first computing node sends the access address of the first storage object to the client.

Optionally, the first computing node is further configured to pre-allocate one or more storage objects to the client before receiving the data write request, where each storage object corresponds to one access address, and the access address of each storage object includes an identifier of the storage object and an offset of the storage object. The first computing node sends the access address of each storage object to the client, and the client stores the access address. When the client needs to store data, the client does not need to apply to a computing node for a storage object, and may directly send a write instruction to a storage node based on a stored access address of the storage object. Because the first computing node may pre-allocate a plurality of storage objects, and send access addresses of these storage objects to the client for storage, the client does not need to apply to the first computing node for storage object allocation each time the client needs to store data, thereby saving network resources.

Optionally, the first hard disk has an object semantic interface. In the first aspect, the first write instruction sent by the client to the first storage node carries the access address of the first storage object. If the first hard disk does not have an object semantic interface, the first hard disk cannot directly identify the access address of the first storage object, and the first storage node needs to translate the access address of the first storage object into an address that can be identified by the first hard disk. This increases a computing amount and lengthens an access path. On the contrary, if the first hard disk has an object semantic interface, the first hard disk may store the log of the to-be-stored data based on the access address of the first storage object without address translation. This reduces a computing amount and shortens an access path.

Optionally, the first computing node is further configured to send a first response message to the client after writing the to-be-stored data into the memory of the first computing node. The first response message is used to indicate to the client that the to-be-stored data has been written to the memory. The first storage node is further configured to send a second response message to the client after the log of the to-be-stored data is written onto the first hard disk. The second response message is used to indicate to the client that the log of the to-be-stored data has been written onto the first hard disk. The client is further configured to, after receiving the first response message and the second response message, feed back, to the application that triggers data storage, that the to-be-stored data has been stored. Because a write-ahead logging (WAL) manner is used, after separately receiving an indication indicating that the data has been written into the memory and an indication indicating that the data has been written into the log, the client feeds back to the application that the to-be-stored data has been stored. In this way, data storage reliability can be ensured.

Optionally, the first computing node is further configured to, when a total amount of data written into the memory of the first computing node reaches a preset threshold, write a part or all of the data as to-be-moved data onto one or more hard disks. The one or more hard disks may be located on one storage node, or may be located on a plurality of different storage nodes. When data needs to be moved, the first computing node sends a second write instruction to a storage node, where the second write instruction includes the to-be-moved data and an access address of a storage object that is allocated by the first computing node to the to-be-moved data. When the first computing node sends a plurality of second write instructions to one or more storage nodes, each second write instruction includes a part of the to-be-moved data and an access address of a storage object corresponding to the part of the to-be-moved data. The access address of the storage object includes an identifier of the allocated storage object and an offset of the storage object. Each storage node receiving the second write instruction parses the second write instruction to obtain the to-be-moved data and the access address, and forwards the to-be-moved data and the access address to a corresponding hard disk. Each hard disk writes the to-be-moved data (or a part of the to-be-moved data) into a storage medium of the hard disk based on the access address. The access address includes one or more access addresses. Optionally, the to-be-moved data includes the to-be-stored data in the first aspect.

Optionally, the first storage node is further configured to, after the to-be-moved data is written onto the one or more hard disks, delete one or more logs corresponding to the to-be-moved data. Because the to-be-moved data has been stored on the one or more hard disks, the previously stored log of the to-be-moved data may be deleted, to save storage space.

A second aspect of this disclosure provides a data storage method. The method is applied to the storage system provided in the first aspect, to implement a function of the storage system.

A third aspect of this disclosure provides another storage system. The system includes a plurality of computing nodes and a plurality of storage nodes. Each storage node includes one or more hard disks. A first storage node in the plurality of storage nodes is configured to receive a write instruction sent by a client, where the write instruction includes to-be-stored data related to an application, and an access address of a storage object that is allocated by a first computing node in the plurality of computing nodes to the to-be-stored data. The first storage node parses the write instruction to obtain the to-be-stored data and the access address of the storage object, and forwards the to-be-stored data and the access address of the storage object to a first hard disk included on the first storage node. The first hard disk writes, based on the access address of the storage object, the to-be-stored data into storage space corresponding to the storage object.

According to the storage system provided in the third aspect, on the first storage node, the access address of the storage object does not need to be translated into another address, and instead, the access address of the storage object is directly forwarded to the first hard disk, and the first hard disk stores the log based on the access address of the storage object. In comparison with the conventional technology, a data access path is shortened because an address does not need to be translated.

Optionally, the first computing node is further configured to allocate the storage object to the to-be-stored data, where the access address of the storage object includes an identifier of the storage object and an offset of the storage object. The first computing node sends the access address of the storage object to the client. The storage object may be applied for by the client to the first computing node when the client needs to store data, or the first computing node may pre-allocate one or more storage objects and send access addresses of these storage objects to the client for storage.

Optionally, the first hard disk has an object semantic interface. In the third aspect, the write instruction sent by the client to the first storage node carries the access address of the storage object. When the first hard disk does not have an object semantic interface, the first hard disk cannot directly identify the access address of the storage object, and the first storage node needs to translate the access address of the storage object into an address that can be identified by the first hard disk. This increases a computing amount and lengthens an access path. On the contrary, when the first hard disk has an object semantic interface, the first hard disk may store a log of the to-be-stored data based on the access address of the storage object without address translation. This reduces a computing amount and shortens an access path.

A fourth aspect of this disclosure provides a data storage method. The method is applied to the storage system provided in the third aspect, to implement a function of the storage system.

A fifth aspect of this disclosure provides a storage system. The system includes a plurality of computing nodes and a plurality of storage nodes, and each storage node includes one or more hard disks. A first computing node in the plurality of computing nodes is configured to receive a data read request sent by a client, where the data read request is used to request to read to-be-read data. The first computing node obtains an access address corresponding to the to-be-read data, and then sends a read instruction to a first storage node in the plurality of storage nodes, where the read instruction includes the access address. The access address is an access address on a first hard disk included on the first storage node. The first storage node is configured to receive the read instruction, and read the to-be-read data from the first hard disk based on the access address. The first storage node is further configured to return the to-be-read data to the client.

According to the storage system provided in the fifth aspect, when the client needs to read the to-be-read data, the client first queries the first computing node for metadata, to obtain the access address of the to-be-read data. After obtaining the access address, the first computing node may directly send the read instruction to the first storage node, and the first storage node reads the to-be-read data based on the access address, and returns the to-be-read data to the client. In this process, the client obtains the to-be-read data through only three interactions, thereby saving network resources.

Optionally, the data read request includes a logical address of the to-be-read data, and the first computing node stores a correspondence between the logical address and the access address. When querying the access address corresponding to the to-be-read data, the first computing node is further configured to obtain the access address based on the logical address and the correspondence between the logical address and the access address.

Optionally, the access address includes an identifier of a storage object and an offset of the storage object, the identifier of the storage object is used to indicate a storage object that is allocated by the first computing node to the to-be-read data, and the offset of the storage object is used to indicate a location of the to-be-read data in the storage object.

Optionally, when reading, based on the access address, the to-be-read data from the first hard disk included on the first storage node, the first storage node is further configured to forward the read instruction to the first hard disk. The first hard disk reads the to-be-read data based on the access address. The first hard disk has an object semantic interface. The access address carried in the read instruction sent by the client to the first storage node is an address of the storage object. When the first hard disk does not have an object semantic interface, the first hard disk cannot directly identify the access address, and the first storage node needs to translate the access address into an address that can be identified by the first hard disk. This increases a computing amount and lengthens an access path. On the contrary, when the first hard disk has an object semantic interface, the first hard disk may read the to-be-read data based on the access address without address translation. This reduces a computing amount and shortens an access path.

A sixth aspect of this disclosure provides a data read method. The method is applied to the storage system provided in the fifth aspect, to implement a function of the storage system.

A seventh aspect of this disclosure provides a storage node. The storage node includes a network interface card and one or more hard disks. The network interface card is configured to receive a first write instruction, where the first write instruction includes a log of to-be-stored data and an access address of a first storage object that is allocated to the log of the to-be-stored data. The network interface card forwards the log of the to-be-stored data and the access address of the first storage object to a first hard disk, where the first hard disk is one of the one or more hard disks, and the access address of the first storage object is located on the first hard disk. The first hard disk is configured to write, based on the access address of the first storage object, the log of the to-be-stored data into storage space corresponding to the first storage object. The log of the to-be-stored data includes but is not limited to the to-be-stored data (a format of the to-be-stored data included in the log is different from a format of the to-be-stored data described above), a time at which the to-be-stored data is received, a corresponding operation type (for example, a write instruction or a read instruction), an access address of the to-be-stored data, and the like. Therefore, before a write instruction is actually executed, a log, that is, a data write operation, is recorded. This can ensure data integrity.

According to the storage node provided in the seventh aspect, the storage node includes neither a processor nor a memory. The network interface card receives a write instruction, and forwards, to the first hard disk, a log of to-be-stored data and an access address of a first storage object that is allocated to the log of the to-be-stored data, where the log of the to-be-stored data and the access address of the first storage object that is allocated to the log of the to-be-stored data are included in the write instruction. The first hard disk stores the log of the to-be-stored data based on the access address of the first storage object. In comparison with the conventional technology, computing resources are saved and a data access path is shortened because an address does not need to be translated.

Optionally, the storage node provided in the seventh aspect may be applied to a write process in which a WAL manner is used, or may be applied to a write process in which to-be-stored data is directly written onto a hard disk. The network interface card is further configured to receive a second write instruction, where the second write instruction includes the to-be-stored data and an access address of a second storage object that is allocated to the to-be-stored data. The access address of the second storage object includes an identifier of the second storage object and an offset of the second storage object. The network interface card forwards the to-be-stored data and the access address of the second storage object to the first hard disk. The first hard disk is further configured to write, based on the access address of the second storage object, the to-be-stored data into storage space corresponding to the second storage object.

Optionally, the access address of the first storage object or the access address of the second storage object further includes a hard disk identifier, and the network interface card is further configured to determine the first hard disk from the one or more hard disks based on the hard disk identifier.

Optionally, the first hard disk has an object semantic interface.

Optionally, the network interface card may receive a plurality of write instructions, where each write instruction carries to-be-stored data and an access address of a storage object that is allocated to the to-be-stored data. The access address includes a hard disk identifier. The network interface card determines, based on a hard disk identifier in each write instruction, a hard disk corresponding to the to-be-stored data, and sends the write instruction to the corresponding hard disk. Each hard disk writes, based on the access address, the to-be-stored data into a corresponding storage object.

An eighth aspect of this disclosure provides a data storage method. The method is applied to the storage node provided in the seventh aspect, to implement a function of the storage node.

A ninth aspect of this disclosure provides a hard disk. The hard disk has an object semantic interface. The hard disk is configured to receive to-be-stored data and an access address of the to-be-stored data, and store the to-be-stored data based on the access address.

A tenth aspect of this disclosure provides a storage system. The storage system includes a plurality of computing nodes and a plurality of storage nodes, and each storage node includes one or more hard disks. A first computing node in the plurality of computing nodes is configured to receive a data read request sent by a client, where the data read request is used to request to read to-be-read data. The first computing node obtains, through query, a fingerprint of metadata corresponding to the to-be-read data, determines a second computing node to which the fingerprint belongs, and sends the data read request to the second computing node. The second computing node obtains, based on the fingerprint, the metadata corresponding to the to-be-read data, where the metadata includes an access address of the to-be-read data. The second computing node sends a read instruction to a first storage node, where the read instruction includes the access address of the to-be-read data. The first storage node reads the to-be-read data based on the access address, and sends the to-be-read data to the client.

An eleventh aspect of this disclosure provides a data read method. The method is applied to the storage system provided in the tenth aspect, to implement a function of the storage system.

A twelfth aspect of this disclosure provides a computer program product. The program product is run on a hard disk and is executed by a processor of the hard disk, to implement a function of the hard disk provided in the ninth aspect.

A thirteenth aspect of this disclosure provides a computer program product. When the computer program product is run on a computer, the computer is enabled to perform the methods in the foregoing aspects.

A fourteenth aspect of this disclosure provides a computer-readable medium. The computer-readable medium stores instructions, and when the instructions are run on a computer, the computer is enabled to perform the methods in the foregoing aspects.

BRIEF DESCRIPTION OF DRAWINGS

To describe the technical solutions in some of the embodiments of the present disclosure more clearly, the following briefly describes the accompanying drawings for the embodiments.

DESCRIPTION OF EMBODIMENTS

The following describes the technical solutions in the embodiments of the present disclosure with reference to the accompanying drawings.

Network architectures and service scenarios described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that with evolution of the network architectures and emergence of new service scenarios, the technical solutions provided in the embodiments of the present disclosure are also applicable to similar technical problems.

Figure 1:
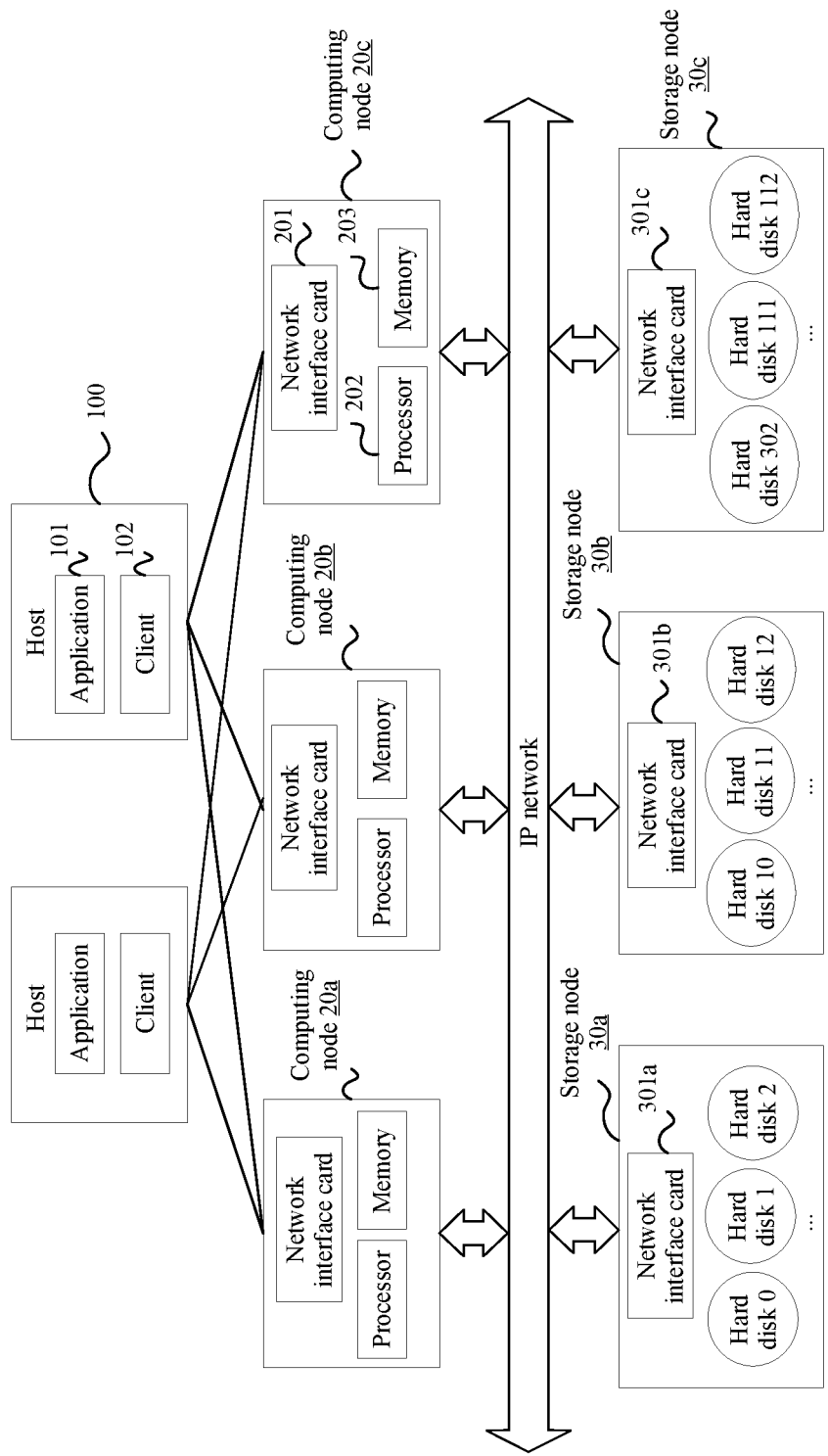
FIG. 1 is an architectural diagram of a storage system according to an embodiment.

As shown in FIG. 1, a storage system provided in this embodiment includes a host cluster, a computing node cluster, and a storage node cluster. The host cluster includes one or more hosts 100 (FIG. 1 shows two hosts 100, but there are not limited to two hosts 100). The host 100 is a computing device on a user side, such as a server or a desktop computer. An application program (or application) 101 and a client program (client) 102 are run on the host 100. The application 101 is a general term of various application programs presented to a user. The client 102 is configured to receive a data access request triggered by the application 101, interact with a computing node 20, and send the data access request to the computing node 20. The client 102 is further configured to receive data from a computing node, and forward the data to the application 101. The client 102 may alternatively be implemented by a hardware component located inside the host 100. It may be understood that, when the client 102 is a software program, a function of the client 102 is implemented by a processor included on the host 100 by running the program. Any client 102 on the host cluster may access any computing node 20 in the computing node cluster through a network.

The computing node cluster includes one or more computing nodes 20 (FIG. 1 shows three computing nodes 20, but there are not limited to three computing nodes 20), and the computing nodes 20 may be interconnected. The computing node 20 is a computing device, such as a server, a desktop computer, or a controller of a storage array. In terms of hardware, as shown in FIG. 1, the computing node 20 includes at least a processor 202, a memory 203, and a network interface card 201. The processor 202 is a central processing unit (CPU), and is configured to process a data access request from the outside of the computing node 20 or a request generated on the computing node 20. The memory 203 is configured to temporarily store data received from the host 100 or data read from a storage node 30. When receiving a plurality of write requests sent by the host 100, the computing node 20 may temporarily store data in the plurality of write requests into the memory 203. When a total amount of data in the memory 203 reaches a specific threshold, the data stored in the memory 203 is sent to a hard disk 302 on the storage node 30 for storage. The memory 203 includes a volatile memory, for example, a random-access memory (RAM). The memory 203 may have a power failure protection function. The power failure protection function means that the data stored in the memory 203 is not lost even when a system is powered on again after a power failure. Generally, a memory with a power failure protection function is referred to as a nonvolatile memory. The network interface card 201 is configured to communicate with the host 100, and is further configured to communicate with the storage node 30. Further, the computing node 20 may receive a request from the host 100 through the network interface card 201, or send a request to the host 100 through the network interface card 201. The computing node 20 may also send a request to the storage node 30 through the network interface card 201, or receive a request from the storage node 30 through the network interface card 201. In addition, the computing node 20 may further include a bus (not shown in FIG. 1) used for communication between components in the computing node 20. Functionally, the computing node 20 is mainly configured to perform data computing or processing, for example, metadata management, deduplication, data compression, storage space virtualization, and address translation.

Any computing node 20 may access any storage node 30 in the storage node cluster through an Internet Protocol (IP) network. The storage node cluster includes a plurality of storage nodes 30 (FIG. 1 shows three storage nodes 30, but there are not limited to three storage nodes 30). One storage node 30 may be, for example, just a bunch of flash (JBOF), and includes a network interface card 301 and a plurality of hard disks 302 (for example, a hard disk 302, a hard disk 111, and a hard disk 112). The network interface card 301 is configured to communicate with the computing node 20. The hard disk 302 is configured to store data, and may be a magnetic disk or another type of storage medium, for example, a solid-state drive or a shingled magnetic recording hard disk.

Generally, a control device is further disposed on a conventional storage node, and the control device mainly includes a processor and a memory. The processor and the memory are computing resources. Therefore, the conventional storage node has a specific computing capability, and the conventional storage node and the computing node 20 are jointly responsible for a data processing task. The storage node 30 provided in this embodiment does not have a control device, and naturally has neither a processor nor a memory on the control device. In other words, the storage node 30 in this embodiment does not have a conventional computing capability, a main function of the storage node 30 is data storage, the network interface card implements access to data on the hard disk, and tasks of performing data computing or processing are all completed by the computing node 20.

In addition, the conventional storage node generally includes at least two control devices. There is a relationship between a hard disk and a control device, and each control device can access only a hard disk to which the control device belongs. Therefore, this usually relates to data access request forwarding between control devices. Consequently, a data access path is relatively long. In addition, when storage space is insufficient, when a new disk is added to a storage node, a relationship between the disk and a control device needs to be rebound, and an operation is complex. Consequently, scalability of the storage space is poor.

In this embodiment, there is no relationship between the network interface card 301 and the hard disk 302 on the storage node 30, and the network interface card 301 may access any hard disk 302 on the storage node 30. Therefore, it is relatively convenient to expand a hard disk when storage space is insufficient. In addition, after receiving a write instruction sent by the client 102 or the computing node 20, the network interface card 301 parses the write instruction, and writes to-be-stored data onto a corresponding hard disk based on an access address carried in the write instruction. Translation between the access address and a hard disk address does not need to be performed, and therefore, the data access path is shortened.

Figure 2:
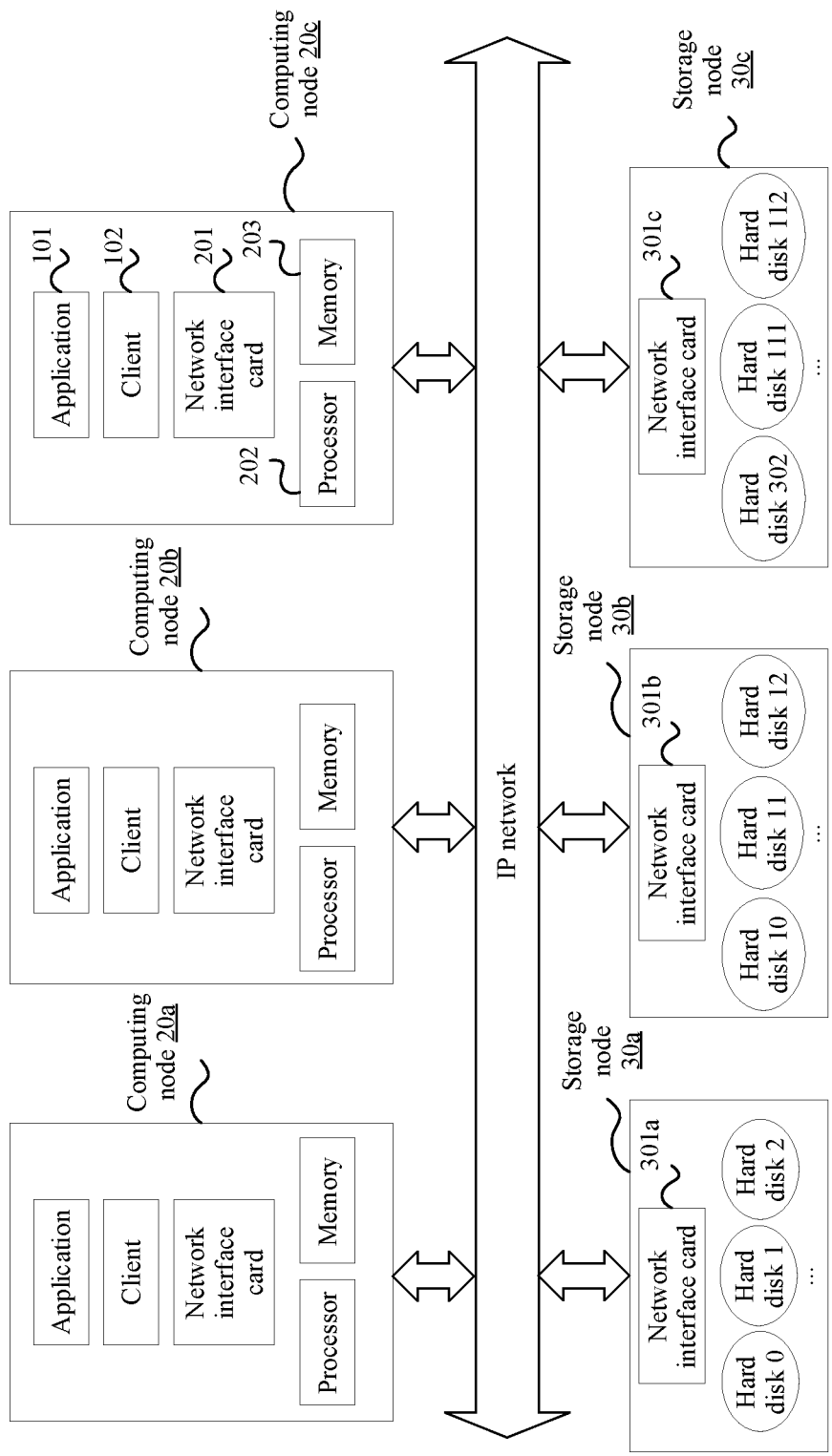
FIG. 2 is an architectural diagram of another storage system according to an embodiment.

For a network architecture of another storage system provided in an embodiment, refer to FIG. 2. As shown in FIG. 2, in this network architecture, an application 101 and a client 102 are deployed on a computing node 20. Therefore, the application 101 may directly trigger a data access request (the data access request in this embodiment includes a data write request or a data read request) by using the client 102 on the computing node 20. The data access request is processed by the computing node 20, or is sent to another computing node 20 for processing. In this case, that the client 102 sends the data access request to the computing node 20 means that the client 102 sends the data access request to a processor 202. In comparison with the network architecture shown in FIG. 2, the data access request needs to pass through only one hop of network (a network between the computing node and a storage node) to reach a hard disk 302 from the client 102. However, in the network architecture shown in FIG. 1, the data access request needs to pass through two hops of networks (a network between the host and the computing node, and a network between the computing node and the storage node) to reach the hard disk 302 from the client 102. Except the foregoing description, components included in the computing node 20 and functions of the components are similar to those of the computing node 20 in FIG. 1. Details are not described herein again.

Figure 3:
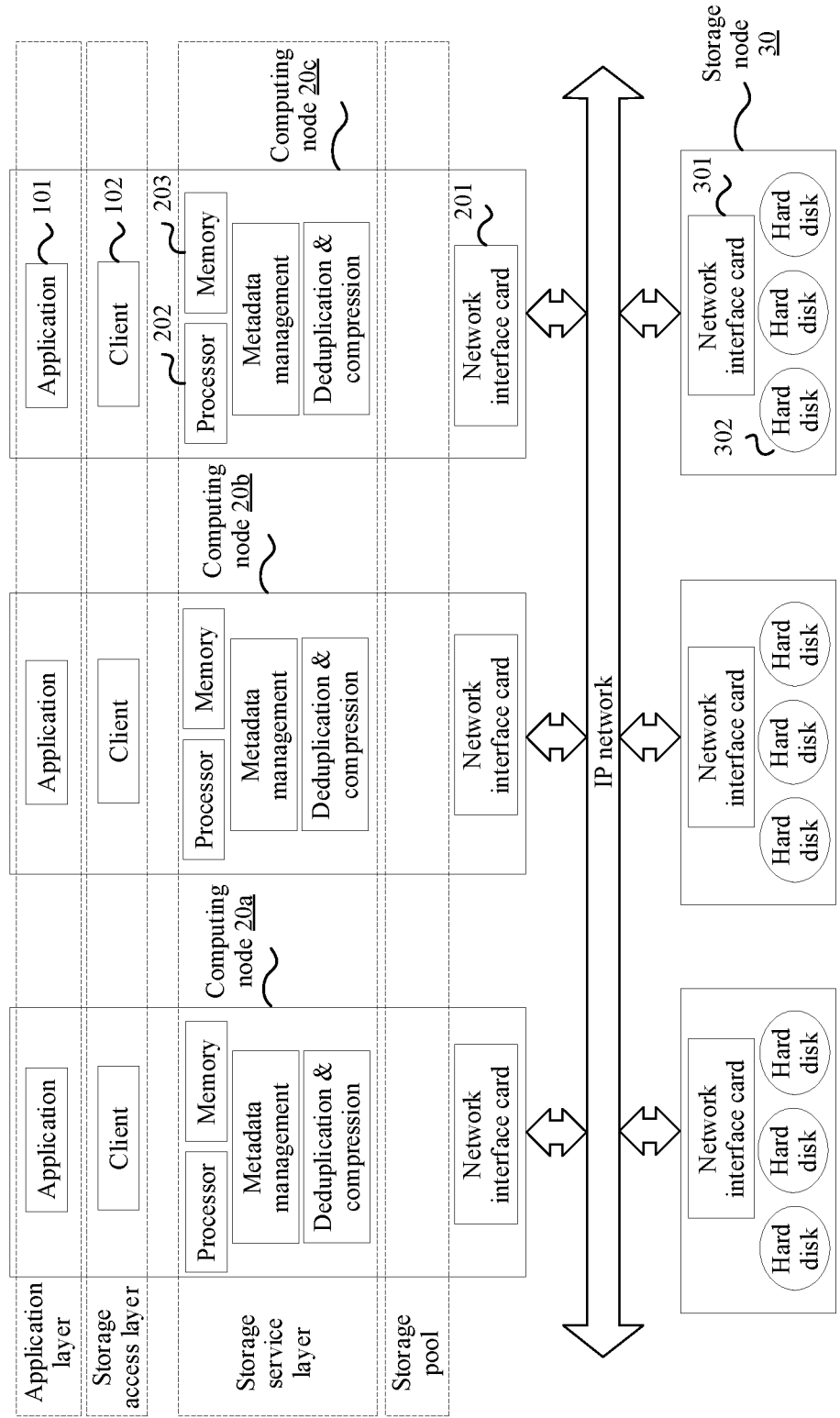
FIG. 3 is a schematic diagram of deployment of a logical layer of a computing node according to an embodiment.

FIG. 3 is a schematic diagram of deployment of a logical layer according to an embodiment. In the storage system shown in FIG. 2, applications 101 on all computing nodes 20 constitute an application layer, and clients 102 on all the computing nodes 20 constitute a storage access layer. Computing resources and software modules on all the computing nodes 20 constitute a storage service layer. The computing resources include a processor 202 and a memory 203. The software modules include but are not limited to a metadata management module (metadata management shown in FIG. 3) and a deduplication and compression module (deduplication and compression shown in FIG. 3). The software module may be stored in the memory 203, and the processor 202 invokes program code of the software module to run the program code. The storage service layer is used to perform computing or processing on a received data access request, for example, provide storage services such as background disk flushing, erasure coding (EC) parity, deduplication, and data compression. Each computing node 20 includes a metadata management module, and the metadata management module is configured to store metadata. To achieve a purpose of load balance, metadata in the storage system is evenly stored on each computing node 20 according to a specific distribution principle. Therefore, each metadata management module maintains a part of metadata.

In addition, the storage system further includes a storage pool. The storage pool is configured to provide storage space. The storage space comes from a hard disk 302 on a storage node 30.

An actual address of the storage space provided by the hard disk 302 is not directly exposed to the computing node 20 or a host 100. In actual application, a part or all of hard disks 302 included on all storage nodes 30 constitute the storage pool, each hard disk 302 is divided into several chunks, a plurality of chunks from different hard disks 302 or different storage nodes 30 constitute one storage object, and the storage object is a minimum allocation unit of the storage pool. When the storage service layer applies to the storage pool for storage space, the storage pool may provide one or more storage objects for the storage service layer. The storage service layer further virtualizes the storage space provided by the storage object into a logical unit (LU) for the host 100 to use. Each logical unit has a unique logical unit number (LUN). Because the host 100 can directly sense the logical unit number, a person skilled in the art usually directly uses the LUN to refer to the logical unit. Each LUN has a LUN identifier (ID), where the LUN ID is used to identify the LUN. A specific location of data in a LUN may be determined based on a length of the data and a start address. A person skilled in the art usually refers to the start address as a logical block address (LBA). It may be understood that three factors such as the LUN ID, the LBA, and the length identify a specific address segment. A data access request generated by the host 100 usually carries the LUN ID, the LBA, and the length.

A quantity of chunks included in a storage object depends on a mechanism (or a redundancy mode) used to ensure data reliability. Generally, to ensure data reliability, the storage system usually uses a multi-copy mechanism or an EC parity mechanism to store data. In the multi-copy mechanism, at least two identical data copies are stored, and another data copy can be used for restoration when one data copy is lost. When the multi-copy mechanism is used, one storage object includes at least two chunks, and each chunk is located on different hard disks 302 or located on different storage nodes 30. In the EC parity mechanism, to-be-stored data is divided into at least two data fragments, a parity fragment of the at least two data fragments is calculated based on a specific parity algorithm, and another data fragment and the parity fragment may be used for data restoration when one data fragment is lost. When the EC parity mechanism is used, one storage object includes at least three chunks, and each chunk is located on different hard disks 302 or located on different storage nodes 30.

Figure 4:
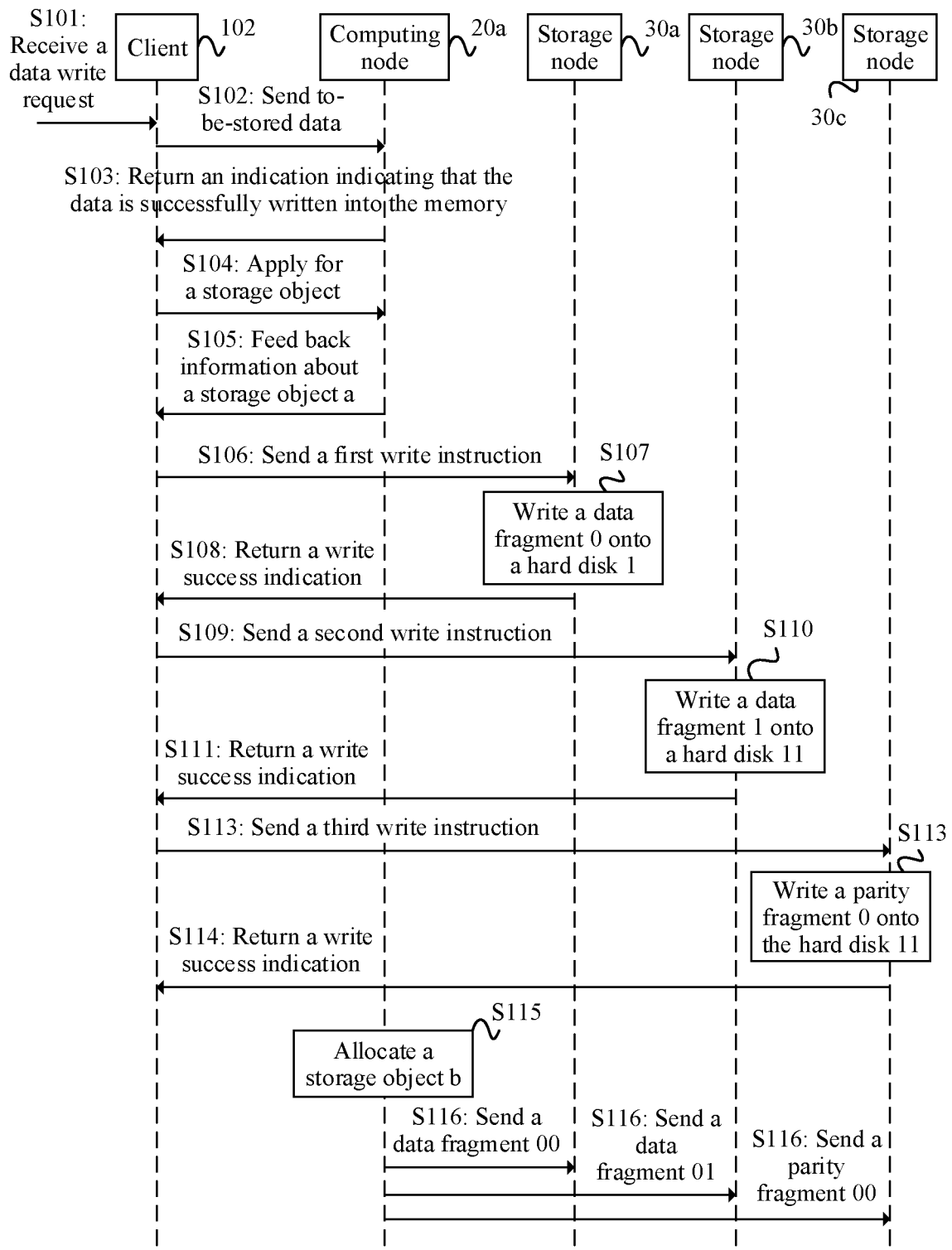
FIG. 4 is a schematic flowchart of a data write method according to an embodiment.

With reference to the network architecture shown in FIG. 1 or FIG. 2 and the logical layer shown in FIG. 3, the embodiments provide at least two data write request processing manners. FIG. 4 is a schematic flowchart of a data write method according to an embodiment. In this method, a data write request is executed in a WAL manner. WAL is a technology used to ensure data integrity. Simply, before the data write request is actually executed, a data write operation is first recorded, and the record is a log. When data is subsequently modified, all modification records are also stored in the log. The log is first stored on a hard disk persistently. After the log is stored successfully, a data storage operation is performed. In a storage process, no matter in which step an error occurs, the log stored on the hard disk can be replayed to obtain a correct result. In actual application, because an amount of to-be-stored data carried in the data write request is usually relatively large, operations are complex, and data is not necessarily written in sequence, when a next operation can be performed only after a result of a previous operation is written onto the hard disk, efficiency is very low. In the WAL manner, a data amount of logs is very small and the logs are written in sequence. Therefore, write efficiency can be increased. Generally, the log includes but is not limited to the to-be-stored data (a format of the to-be-stored data included in the log is different from a format of the to-be-stored data described above), a time at which the to-be-stored data is received, a corresponding operation type (for example, a write instruction or a read instruction), an access address of the to-be-stored data, and the like.

For example, the method may be applied to the storage system shown in any one of FIG. 1, FIG. 2, and FIG. 3. FIG. 1 is used as an example. As shown in the schematic flowchart in FIG. 4, the method includes the following steps.

In S101, the client 102 receives a data write request, where the data write request includes to-be-stored data and an address of the to-be-stored data. The data write request received by the client 102 is from the application 101, and the address of the to-be-stored data includes a LUN ID, an LBA, and a length.

In S102, the client 102 obtains a corresponding computing node through calculation based on the address of the to-be-stored data and a preset algorithm, and sends the to-be-stored data to the corresponding computing node. For ease of description, an example in which a determined computing node 20 that is to process the data write request is a computing node 20a is used for description herein. The client 102 sends the to-be-stored data to the computing node 20a. The computing node 20a receives the to-be-stored data through a network interface card 201, and writes the to-be-stored data into a memory 203. Herein, two manners may be used for implementation. One manner is that the network interface card 201 directly writes the to-be-stored data into the memory 203 by using a direct memory access (DMA) mechanism. The other manner is that the network interface card 201 transfers the to-be-stored data to a processor 202, the processor 202 writes the to-be-stored data into the memory 203.

In S103, the computing node 20a returns, to the client 102, an indication indicating that the to-be-stored data has been written into the memory.

In S104, the client 102 applies to the computing node 20a for a storage object to store a log of the to-be-stored data. Similarly, the client 102 may obtain a corresponding computing node (the computing node 20a is still used as an example for description) through calculation based on the address of the to-be-stored data and a preset algorithm. After determining the corresponding computing node, the client 102 may send a storage object application request to the computing node 20a. It may be understood that, when the computing node 20a is busy, the computing node 20a may forward the storage object application request to another computing node 20, and the other computing node 20 allocates a storage object to the client 102.

In S105, the computing node 20 allocates one or more storage objects to the to-be-stored data, and feeds back information about the allocated one or more storage objects (the information includes a quantity of storage objects and access address information of each storage object) to the client 102. Further, a storage pool management module may be disposed in the memory 203. After the computing node 20a receives the storage object application request through the network interface card 201, the processor 202 runs the storage pool management module, to allocate one or more storage objects to the to-be-stored data and obtain an access address of each of the one or more storage objects, where the access address includes an identifier, an offset, and the like of the storage object. In another implementation, the computing node 20 may alternatively reserve a storage object for the client in advance, and after receiving a data write request, allocate one or more storage objects that are reserved in advance to the to-be-stored data. Herein, that the computing node 20 allocates a storage object a is used as an example. The computing node 20 feeds back information about the allocated storage object a to the client 102.

In an implementation, the computing node 20 sends an access address of the storage object a to the client 102. The client 102 obtains a corresponding partition through calculation based on the access address of the storage object a, and further determines a storage node 30 and a hard disk that correspond to the log. The client 102 uses an object identifier, an offset, or a combination thereof in the access address of the storage object a as an input, and obtains, through calculation by using a preset hash algorithm, the partition corresponding to the storage object. Then, the client 102 sends a query instruction to the computing node 20a to obtain the corresponding storage node 30 and the access address of the storage object a. The query instruction carries the partition (which may be a value of the partition, or may be an identifier of the partition), and a correspondence between a partition and a hard disk is stored in a metadata management module of the computing node 20a. Therefore, the computing node 20a may determine, by using the metadata management module, a hard disk used to store the to-be-stored data. The redundancy mode described above may be a multi-copy mechanism or an EC parity mechanism. In this embodiment, an EC parity mechanism is used as an example. The log is divided into two data fragments, and one parity fragment is obtained through calculation based on the two data fragments (which are a data fragment 0 and a data fragment 1). Correspondingly, the partition corresponds to three hard disks: a hard disk 1, a hard disk 11, and a hard disk 111. The hard disk 1 and the hard disk 11 are configured to store the two data fragments, and the hard disk 111 is configured to store the one parity fragment. After learning the corresponding hard disk, the computing node 20a may further determine that a storage node on which the hard disk 1 is located is a storage node 30a, a storage node on which the hard disk 11 is located is a storage node 30b, and a storage node on which the hard disk 111 is located is a storage node 30c. Then, the computing node 20a may send an IP address of the storage node 30a, an IP address of the storage node 30b, an IP address of the storage node 30c, an identifier of the hard disk 1, an identifier of the hard disk 11, and an identifier of the hard disk 111 to the client 102. In addition, the computing node 20a may determine a write location of the allocated storage object by using the metadata management module, and feed back the write location to the client 102.

In another implementation, after the computing node 20a allocates the storage object to the client 102, the computing node 20 may obtain, through calculation by using a preset hash algorithm, a partition corresponding to the storage object, determine, in a metadata management module, a hard disk corresponding to the partition, and further determine a corresponding storage node 30. Information such as an access address of the storage object, an identifier of the corresponding hard disk, and an IP address of the corresponding storage node 30 is sent to the client 102 together. This reduces interaction between the client 102 and the computing node 20a.

In another implementation, the computing node 20a may pre-allocate one or more storage objects to the client 102, and the client 102 locally stores access addresses of these storage objects, an identifier of the corresponding hard disk, an IP address of the corresponding storage node 30, and the like in advance. When receiving the data write request sent by the application 101, the client 102 may directly use the pre-allocated storage object, and does not need to apply to the computing node 20a for the storage object. In this way, interaction between the client 102 and the computing node 20a is further reduced.

According to any one of the foregoing implementations, the client 102 obtains the access address of the storage object used to store the to-be-stored data, the information about the storage node, and the information about the hard disk. Therefore, the client 102 can directly communicate with the storage node 30 without using the computing node 20a. After allocating the storage object, the computing node 20a stores a correspondence between a logical address of the to-be-stored data and the access address of the allocated storage object into the metadata management module. When the data needs to be read subsequently, a location of the data in the storage object may be obtained based on the correspondence.

In S106, the client 102 sends a first write instruction to the storage node 30a, where the first write instruction carries the data fragment 0, the identifier of the hard disk 1, and an access address of the storage object.

In S107, the storage node 30a receives the first write instruction through a network interface card 301a, and the network interface card 301a parses the first write instruction, to obtain the data fragment 0, the identifier of the hard disk 1, and the access address of the storage object. The network interface card 301a then indicates the hard disk 1 to write the data fragment 0 into a corresponding location of the storage object. After completing the write operation, the hard disk 1 returns a write success indication to the network interface card 301a, to indicate that the data fragment 0 has been successfully written onto the hard disk 1.

Further, a queue is maintained on the network interface card 301a, and is referred to as a network interface card queue. The network interface card queue includes a network interface card receiving queue and a network interface card sending queue. The network interface card receiving queue is used to store an instruction sent by another node (for example, the client 102 or the computing node 20), and the network interface card sending queue is used to store an instruction to be sent to the other node. A queue (or a hard disk queue) is also maintained on each hard disk 302. The hard disk queue includes a hard disk receiving queue and a hard disk sending queue. The hard disk receiving queue is used to store an instruction from the network interface card 301a, and the hard disk sending queue is used to store an instruction to be sent to the network interface card 301a. After receiving the first write instruction, the network interface card 301a stores the first write instruction into the network interface card receiving queue, and parses the first write instruction to obtain the data fragment 0 and the information about the storage object. Then, the network interface card 301a writes the first write instruction into a hard disk receiving queue of the corresponding hard disk based on the identifier of the hard disk, so that the hard disk executes the first write instruction. Alternatively, the network interface card 301a generates a first write command after obtaining the data fragment 0 and the information about the storage object, and writes the first write command into a corresponding hard disk receiving queue. The first write command is different from the first write instruction, but includes partial information in the first write instruction. The partial information includes but is not limited to the data fragment 0 and the access address of the storage object. Similar to the storage node 30a, queues are also stored on a network interface card and a hard disk of another storage node. Details are not described herein again. The hard disk 1 has an object semantic interface, and therefore can directly write the data fragment 0 into the corresponding location of the storage object. After completing the write operation, the hard disk 1 returns a write success indication to the network interface card 301a, to indicate that the data fragment 0 has been written onto the hard disk 1. Further, the hard disk may generate a response message in the hard disk sending queue, and write the response message into the network interface card sending queue, to notify the network interface card 301a that the data fragment 0 has been written onto the hard disk.

Generally, the hard disk has an interface configured to receive a read/write instruction (a read instruction or a write instruction) sent by the host 100 or the computing node 20.

The interface may be a hardware interface, or may be implemented by using software. In a known technology, the interface of the hard disk is based on data block semantics, that is, the hard disk can directly identify an address of a data block, and store data or read data based on the address of the data block. However, when the read/write instruction carries an address of a storage object, the hard disk needs to translate the address of the storage object into an address of a data block. In this embodiment provided in this disclosure, the hard disk has an object semantic interface. By using the object semantic interface, the hard disk can directly identify an address of a storage object, and store data or read data based on the address of the storage object. Therefore, when the read/write instruction carries the address of the storage object, the hard disk can directly access the data without address translation.

In S108, the network interface card 301a returns a write success indication to the client 102, to indicate that the data fragment 0 has been written onto the storage node 30a.

In S109, the client 102 sends a second write instruction to the storage node 30b, where the second write instruction carries the data fragment 1, the identifier of the hard disk 11, and an access address of the storage object.

In S110, the storage node 30b receives the second write instruction through a network interface card 301b, the network interface card 301b parses the second write instruction, and then the network interface card 301b indicates the hard disk 11 to write the data fragment 1 into a corresponding location of the storage object. After completing the write operation, the hard disk 11 returns a write success indication to the network interface card 301b, to indicate that the data fragment 1 has been written onto the hard disk 11.

In S111, the network interface card 301b returns a write success indication to the client 102, to indicate that the data fragment 1 has been written onto the storage node 30b.

In S112, the client 102 sends a third write instruction to the storage node 30c, where the third write instruction carries a parity fragment 0, the identifier of the hard disk 111, and an access address of the storage object.

In S113, the storage node 30c receives the third write instruction through a network interface card 301c, the network interface card 301c parses the third write instruction, and then the network interface card 301c indicates the hard disk 111 to write the parity fragment 0 into a corresponding location of the storage object. After completing the write operation, the hard disk 111 returns a write success indication to the network interface card 301c, to indicate that the parity fragment 0 has been successfully written onto the hard disk 111. It should be noted that, in the EC parity mechanism, the access addresses of the storage object that are carried in the first write instruction, the second write instruction, and the third write instruction are different. The access address of the storage object includes an identifier of the storage object and an offset of the storage object, and the offset is used to indicate a specific location in the storage object. Data fragments/parity fragments carried in the first write instruction, the second write instruction, and the third write instruction are different, and need to be separately written into different locations in the storage object. Therefore, identifiers of the storage object that are carried in the write instructions are the same, but offsets are different. However, in the multi-copy mechanism, the access addresses of the storage object that are carried in the first write instruction, the second write instruction, and the third write instruction are the same.

In S114, the network interface card 301c returns a write success indication to the client 102, to indicate that the parity fragment 0 has been written onto the storage node 30c.

Steps S106, S109, and S112 are not sequential. The client 102 may send a write instruction to the storage node 30a, the storage node 30b, and the storage node 30c in parallel. After the client 102 receives a write success indication of each data fragment and a write success indication of each parity fragment that are included in the log, it indicates that the log has been successfully written.

So far, the client 102 has received an indication indicating that the data is successfully written into the memory and a log write success indication, and the client 102 may send, to the application 101, an indication indicating that the data write request has been successfully executed. When the client 102 needs to modify the to-be-stored data subsequently, the client 102 also needs to record the modification operation in the log on the hard disk. A specific process is similar to the log storage process described above. Details are not described herein again.

In addition, when an amount of data stored in the memory 203 reaches a specified quantity threshold, the computing node 20a writes the data (or to-be-moved data) stored in the memory 203 onto a hard disk to implement persistent storage. This process is imperceptible to the client 102. It is clear that the amount of the to-be-moved data is greater than or equal to an amount of the to-be-stored data, and the to-be-moved data may include the to-be-stored data that has been written into the memory. The to-be-stored data is used as an example. A process of writing the to-be-stored data onto the hard disk includes the following steps.

In S115, the computing node 20a allocates a storage object b to the to-be-stored data. Further, the computing node 20a runs the storage pool management module, to allocate one or more storage objects (that one storage object is allocated is used as an example in the following) to the to-be-stored data, and obtain an access address of the storage object. The computing node 20a uses an access address of the storage object b as an input, and obtains, through calculation by using a preset hash algorithm, a partition corresponding to the access address of the storage object b. Then, a hard disk for storing the to-be-stored data is determined by querying the metadata management module.

After allocating the storage object b, the computing node 20a stores a correspondence between a logical address of the to-be-stored data and the access address of the allocated storage object into the metadata management module. When the data needs to be read subsequently, a location of the data in the storage object may be obtained based on the correspondence.

Because the log of the to-be-stored data is stored based on the EC parity mechanism, the to-be-stored data is also stored based on the EC parity mechanism. Similar to the storage process of the log, the to-be-stored data is divided into two data fragments, and one parity fragment 00 is obtained through calculation based on the two data fragments (which are a data fragment 00 and a data fragment 01). Correspondingly, the partition corresponds to three hard disks: a hard disk 2, a hard disk 12, and a hard disk 112. The hard disk 2 and the hard disk 12 are configured to store the two data fragments, and the hard disk 112 is configured to store the one parity fragment. After learning the corresponding hard disk, the computing node 20a may further determine that a storage node on which the hard disk 2 is located is the storage node 30a, a storage node on which the hard disk 12 is located is the storage node 30b, and a storage node on which the hard disk 112 is located is the storage node 30c.

In S116, the computing node 20a respectively sends the data fragment 00, the data fragment 01, and the parity fragment 00 to the storage node 30a, the storage node 30b, and the storage node 30c. Further, the data fragment 00 is used as an example. A write instruction sent by the computing node 20a to the storage node 30a includes the data fragment 00, the access address of the storage object b, and an identifier of the hard disk 2. After the storage node 30a receives the write instruction, the network interface card 301a indicates the hard disk 2 to write the data fragment 00 into a corresponding location. A process of writing the data fragment 01 and the parity slice 00 is similar to the process of writing the data fragment 00. After completing a write operation, a network interface card of each storage node feeds back a write success indication to the computing node 20a. Because the process is transparent to the client 102, the computing node 20a does not need to return a write success indication to the client 102.

Optionally, each storage node 30 may be divided into a log area and a data area. The log area is used to store a log, and the data area is used to store data.

In addition to the to-be-stored data, the to-be-migrated data may further include other data. Therefore, the computing node 20a may further allocate a storage object c to the other data, and send a write instruction to the storage object c to store the other data. A manner of executing the write instruction is similar to the process described above. Details are not described herein again. Optionally, when a storage node corresponding to the storage object c overlaps or partially overlaps storage nodes (the storage node 30a, the storage node 30b, and the storage node 30c) corresponding to the storage object b, the computing node 20a sends a write instruction including the other data to a same storage node. The storage node 30a is used as an example. The storage node 30a obtains, by parsing a plurality of write instructions, a hard disk identifier corresponding to each write instruction, and forwards each write instruction to a hard disk indicated by the hard disk identifier.

The data write method may also be applied to the storage system shown in FIG. 2. When the data write method is applied to the storage system shown in FIG. 2, the client 102 obtains a corresponding computing node through calculation based on an address of the to-be-stored data and a preset algorithm. When the corresponding computing node is a local node on which the client 102 is located, the to-be-stored data may be directly written into a memory 203. When the corresponding computing node is another computing node, the client 102 needs to send the to-be-stored data to the other computing node, so that the other computing node writes the to-be-stored data into a memory of the other computing node. This embodiment is described by using an example in which the corresponding computing node is a local node on which the client 102 is located. In addition, a difference from the embodiment shown in FIG. 4 lies in that, because the client 102 is located on the computing node, the client 102 may directly apply to a storage pool management module for allocating a storage object a to store a log of the to-be-stored data, so as to obtain an identifier of the storage object a.

A data write request is executed in a WAL manner. A log is first written, and then data is written. Data stored on a computing node may be accumulated to a specific degree and then written onto a storage node at a time. Therefore, a quantity of times of writing data onto the storage node can be reduced, thereby saving network resources. In addition, the log has been persistently stored on a hard disk before the data is stored on the hard disk. Therefore, even if a fault occurs during data storage, the data can be restored by replaying the log.

Figure 5:
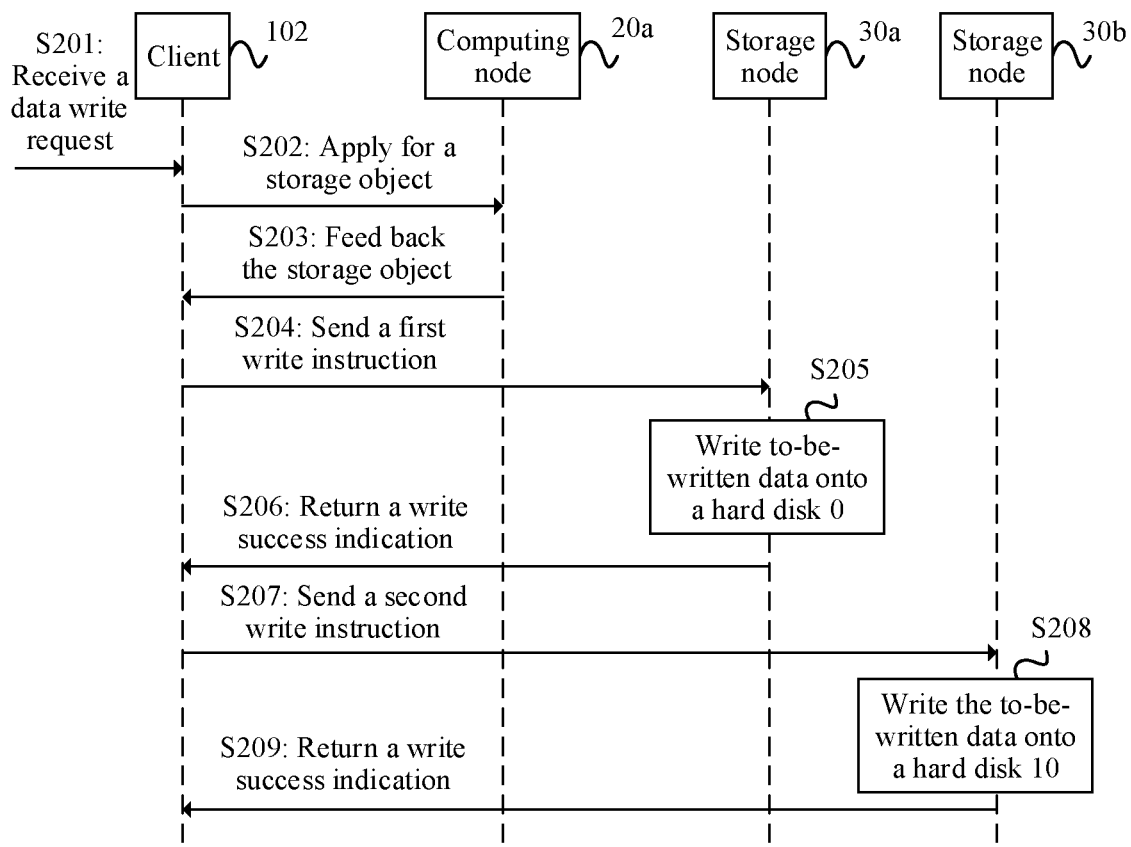
FIG. 5 is a schematic flowchart of another data write method according to an embodiment.

An embodiment of this disclosure further provides another data write request method. The method may also be applied to the system shown in FIG. 1, FIG. 2, or FIG. 3. FIG. 5 is a schematic flowchart corresponding to the method. As shown in FIG. 5, the method includes the following steps.

In S201, the client 102 receives a data write request, where the data write request includes to-be-stored data and a logical address of the to-be-stored data. The data write request received by the client 102 is from the application 101, and the logical address of the to-be-stored data includes a LUN ID, an LBA, and a length.

In S202, the client 102 applies to a computing node 20 for a storage object. Further, the client 102 may obtain a corresponding computing node 20 through calculation based on the address of the to-be-stored data and a preset algorithm. For ease of description, an example in which a determined computing node 20 that is to process the data write request is a computing node 20a is used for description herein. After determining the corresponding computing node, the client 102 may send a storage object application request to the computing node 20a. The storage object application request carries the logical address of the to-be-stored data. Optionally, the storage object application request may include a length of the to-be-stored data, so that a storage pool management module determines a quantity of allocated storage objects based on the length.

In S203, the computing node 20 allocates one or more storage objects to the to-be-stored data, and feeds back information about the allocated storage object (the information includes a quantity of storage objects and access address information of each storage object) to the client 102. Further, a storage pool management module may be disposed in a memory 203. After the computing node 20a receives the storage object application request through a network interface card 201, a processor 202 runs the storage pool management module, to allocate one or more storage objects to the to-be-stored data and obtain an access address of each of the one or more storage objects, where the access address includes an identifier, an offset, and the like of the storage object. In another implementation, the computing node 20 may alternatively reserve a storage object for the client in advance, and after receiving a data write request, allocate one or more storage objects that are reserved in advance to the to-be-stored data.

In an implementation, the computing node 20 sends an access address of the storage object to the client 102. The client 102 obtains a corresponding partition through calculation based on the access address of the storage object, and further determines a storage node 30 and a hard disk of the to-be-stored data. To evenly store data on each hard disk 302, in this embodiment, a distributed hash table (DHT) manner is used for routing, and a hash ring is evenly divided into several parts in the distributed hash table manner, where each part is referred to as a partition. The client 102 uses an object identifier, an offset, or a combination thereof in the access address of the storage object a as an input, and obtains, through calculation by using a preset hash algorithm, the partition corresponding to the storage object. Then, the client 102 sends query instruction to the computing node 20a to obtain the corresponding storage node 30 and the access address of the storage object. The query instruction carries information about the partition (the information about the partition may be a value of the partition, or may be an identifier of the partition), and a correspondence between a partition and a hard disk is stored in a metadata management module of the computing node 20*a*. Therefore, the computing node 20*a* may determine, by using the metadata management module, a hard disk used to store the to-be-stored data. The redundancy mode described above may be a multi-copy mechanism or an EC parity mechanism. When the multi-copy mechanism is used, the partition corresponds to at least two hard disks. When the EC parity mechanism is used, the partition corresponds to at least three hard disks. In this embodiment, two copies are used as an example. In this case, the partition corresponds to two hard disks: a hard disk 0 and a hard disk 10. After learning the corresponding hard disk, the computing node 20*a* may further determine that a storage node on which the hard disk 0 is located is a storage node 30*a* and a storage node on which the hard disk 10 is located is a storage node 30*b*. Then, the computing node 20*a* may send an IP address of the storage node 30*a*, an IP address of the storage node 30*b*, an identifier of the hard disk 0, and an identifier of the hard disk 10 to the client 102. In addition, the computing node 20*a* further needs to send the access address of the storage object to the client 102. The access address of the storage object includes an identifier and an offset of the storage object. According to the storage object provided in this embodiment, data is stored in an appending write mode. Appending write means that to-be-newly-written data (or to-be-modified data) can only be written to the end of the storage object, and existing data cannot be overwritten. When the allocated storage object is an empty object (that is, no data has been stored), the offset of the storage object is 0, that is, a start location. When the storage object is a storage object reserved in advance, the storage object may have stored data, and the offset is an end address of previously stored data. The access address may further include a length of the storage object. A location of the data in the storage object may be determined based on the offset and the length. The computing node 20*a* may determine the access address of the allocated storage object by using the metadata management module, and feed back the access address to the client 102.

In another implementation, after the computing node 20*a* allocates the storage object to the client 102, the computing node 20 may obtain, through calculation by using a preset hash algorithm, a partition corresponding to the identifier of the storage object, determine, in a metadata management module, a hard disk corresponding to the partition, and further determine a corresponding storage node 30. Information such as an access address of the storage object, an identifier of the corresponding hard disk, and an IP address of the corresponding storage node 30 is sent to the client 102 together. This reduces interaction between the client 102 and the computing node 20*a*.

In another implementation, the computing node 20*a* may pre-allocate one or more storage objects to the client 102, and the client 102 locally stores information (including but not limited to the access address of the storage object, the identifier of the corresponding hard disk, the IP address of the corresponding storage node 30, and the like that are described above) of these storage objects in advance. When receiving the data write request sent by the application 101, the client 102 may directly use the pre-allocated storage object, and does not need to apply to the computing node 20*a* for the storage object. In this way, interaction between the client 102 and the computing node 20*a* is further reduced.

According to any one of the foregoing implementations, the client 102 obtains the access address of the storage object used to store the to-be-stored data, the information about the storage node, and the information about the hard disk. Therefore, the client 102 can directly communicate with the storage node 30 without using the computing node 20*a*. After allocating the storage object, the computing node 20*a* stores a correspondence between the logical address of the to-be-stored data and the access address of the allocated storage object into the metadata management module. When the data needs to be read subsequently, a location of the data in the storage object may be obtained based on the correspondence.

In S204, the client 102 sends a first write instruction to the storage node 30*a*, where the first write instruction carries the to-be-stored data, the identifier of the hard disk 0, and an access address of the storage object.

In S205, the storage node 30*a* receives the first write instruction through a network interface card 301*a*, and the network interface card 301*a* parses the first write instruction, to obtain the to-be-stored data, the identifier of the hard disk 0, and the access address of the storage object. The network interface card 301*a* then indicates the hard disk 0 to write the to-be-stored data into a corresponding location of the storage object.

Further, a queue is maintained on the network interface card 301*a*, and is referred to as a network interface card queue. The network interface card queue includes a network interface card receiving queue and a network interface card sending queue. The network interface card receiving queue is used to store an instruction sent by another node (for example, the client 102 or the computing node 20), and the network interface card sending queue is used to store an instruction to be sent to the other node. A queue (or a hard disk queue) is also maintained on each hard disk 302. The hard disk queue includes a hard disk receiving queue and a hard disk sending queue. The hard disk receiving queue is used to store an instruction from the network interface card 301*a*, and the hard disk sending queue is used to store an instruction to be sent to the network interface card 301*a*. After receiving the first write instruction, the network interface card 301*a* stores the first write instruction into the network interface card receiving queue, and parses the first write instruction to obtain the to-be-stored data and the information about the storage object. Then, the network interface card 301*a* writes the first write instruction into a hard disk receiving queue of the corresponding hard disk based on the identifier of the hard disk, so that the hard disk executes the first write instruction. Alternatively, the network interface card 301*a* generates a first write command after obtaining the to-be-stored data and the information about the storage object, and writes the first write command into a corresponding hard disk receiving queue. The first write command is different from the first write instruction, but includes partial information in the first write instruction. The partial information includes but is not limited to the to-be-stored data and the access address of the storage object. Similar to the storage node 30*a*, queues are also stored on a network interface card and a hard disk of another storage node. Details are not described herein again. The hard disk 0 has an object semantic interface, and therefore can directly write the to-be-stored data into the corresponding location of the storage object. After completing the write operation, the hard disk 0 returns a write success indication to the network interface card 301*a*, to indicate that the to-be-stored data has been written onto the hard disk 0. Further, the hard disk 0 may generate a response message in the hard disk sending queue, and write the response message into the network interface card sending queue, to notify the network interface card 301a that the to-be-stored data has been written onto the hard disk 0.

In S206, the network interface card 301a returns a write success indication to the client 102, to indicate that the to-be-stored data has been successfully written onto the storage node 30a.

In S207, the client 102 sends a second write instruction to the storage node 30b, where the second write instruction carries the to-be-stored data, the identifier of the hard disk 10, and an access address of the storage object.

In S208, the storage node 30b receives the second write instruction through a network interface card 301b, and the network interface card 301b parses the second write instruction, to obtain the to-be-stored data, the identifier of the hard disk 10, and the access address of the storage object. The network interface card 301b then indicates the hard disk 10 to write the to-be-stored data into a corresponding location of the storage object. After completing the write operation, the hard disk 10 returns a write success indication to the network interface card 301b, to indicate that the to-be-stored data has been written onto the hard disk 10.

In S209, the network interface card 301b returns a write success indication to the client 102, to indicate that the to-be-stored data has been successfully written onto the storage node 30b.

Steps S204 and S207 are not sequential. The client 102 may send a write instruction to the storage node 30a and the storage node 30b in parallel.

According to the data write method shown in FIG. 4, after applying for a storage object, the client 102 may directly send a write instruction to the storage node 30. This process relates to only one hop of network. In addition, on the storage node, after receiving the write instruction and parsing out an access address of the storage object, the network interface card 301 includes an identifier of the storage object and the access address of the storage object in a command and sends the command to a hard disk, so that the hard disk can directly store data based on the identifier of the storage object and the access address of the storage object. Because processing of a processor on the storage node is skipped, an access path on the storage node is also shortened.

The foregoing method may also be applied to the storage system shown in FIG. 2. Because the client 102 is located on the computing node 20 in the storage system shown in FIG. 2, the client 102 may directly send a storage object application request to a storage pool management module, and the storage pool management module allocates a storage object and obtains an identifier of the storage object. The computing node 20 obtains a corresponding partition through calculation based on the identifier of the storage object, and further determines an access address of the storage object and a storage node 30 and a hard disk of to-be-stored data. This process is similar to that in the embodiment shown in FIG. 5, and a difference lies in that after the corresponding partition is obtained through calculation, the client 102 may directly query a metadata management module to obtain the hard disk used to store the to-be-stored data, and further determine a storage node on which the hard disk is located. Because the client 102 is disposed on the computing node 20, the foregoing steps are all completed on the computing node 20, and data is transmitted through an internal bus without cross-network transmission, thereby saving network resources.

In the foregoing embodiment, after separately receiving the write success indication sent by the storage node 30a and the write success indication sent by the storage node 30b, the client 102 summarizes these write success indications, and then feeds back, to the application 101, the indication indicating that the data write request has been successfully executed.

Figure 6:
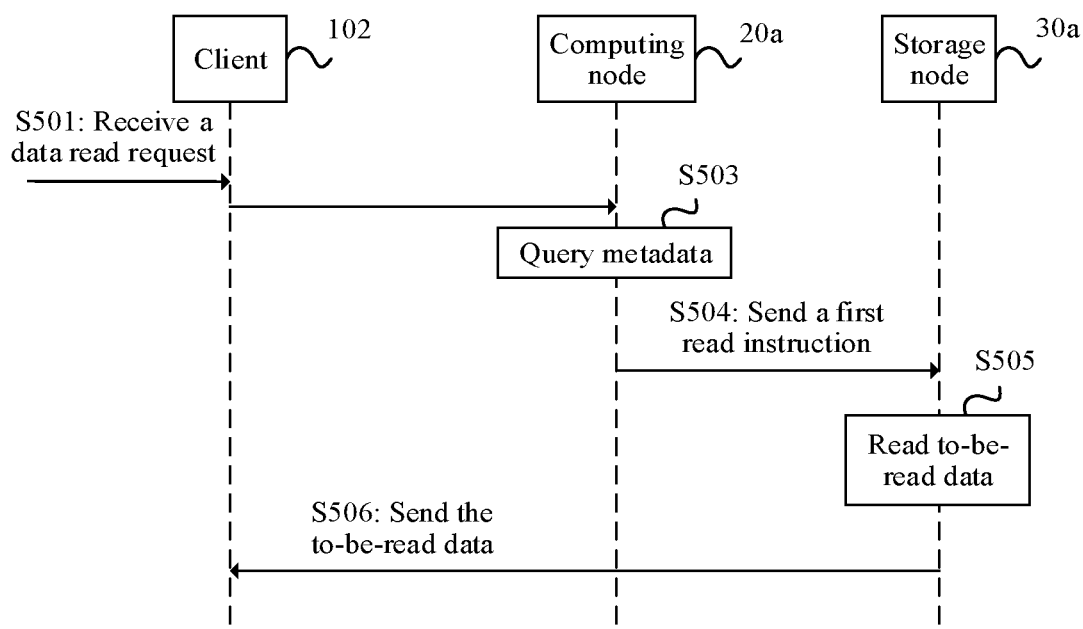
FIG. 6 is a schematic flowchart of a data read method according to an embodiment.

An embodiment of this disclosure further provides a method for executing a data read request. With reference to the storage system provided in FIG. 1 or FIG. 3, the following describes the method for executing a data read request. As shown in FIG. 6, the method includes the following steps.

In S501, the client 102 receives a data read request, where the data read request includes to-be-read data and a logical address of the to-be-read data. The data read request received by the client 102 is from the application 101, and the logical address of the to-be-read data includes a LUN ID, an LBA, and a length. The address is an address presented only to the client 102, and is not an actual storage address of the to-be-read data. Therefore, when the client 102 needs to read the data, the client 102 needs to obtain metadata of the data. The metadata records an identifier of a storage object storing the data and an access address of the storage object. Because the metadata is stored on each computing node 20 in a distributed manner, the client 102 needs to determine a computing node 20 on which the metadata of the to-be-read data is located.

In S502, the client 102 obtains a corresponding computing node through calculation based on the logical address of the to-be-read data and a preset algorithm, and forwards the data read request to the corresponding computing node 20. For ease of description, an example in which the determined computing node 20 of the data read request is a computing node 20a is used for description herein.

In S503, the computing node 20a queries a metadata management module for the metadata of the to-be-read data. The metadata management module stores a correspondence between the logical address and the access address of the storage object. Therefore, the computing node 20a may obtain the access address of the storage object based on the logical address. In addition, the computing node 20a may further obtain a corresponding partition based on the access address of the storage object, and query the metadata management module to obtain a hard disk corresponding to the partition, so as to further obtain a storage node 30 on which the hard disk is located. For example, the partition corresponds to a hard disk 0 and a hard disk 10, the hard disk 0 is located on a storage node 30a, and the hard disk 10 is located on a storage node 30b.

In addition, when the metadata of the to-be-read data is metadata obtained after deduplication processing, the metadata management module may store only a fingerprint of the metadata. In this case, the computing node 20a may determine, through calculation, a computing node (for example, a computing node 20b) to which the fingerprint belongs, and then, forward the data read request to the computing node 20b. After obtaining the metadata by querying a metadata management module of the computing node 20b, the computing node 20b sends a read instruction to a corresponding storage node. In the following steps, that the metadata is not deduplicated is used as an example for description.

In S504, the computing node 20a sends a first read instruction to the storage node 30a, where the read instruction carries the access address of the storage object and an identifier of the hard disk. The access address is used to indicate a location of the to-be-read data in the storage object.

It should be noted that, when a multi-copy mechanism is used, because data stored on all hard disks corresponding to the storage object is the same, data only needs to be read from any hard disk. When an EC parity mechanism is used, the to-be-read data is divided into a plurality of data fragments and a parity fragment, and the read instruction needs to be sent to each hard disk to read all the data fragments and the parity fragment. In this embodiment, the multi-copy mechanism is used as an example for description. A network interface card only needs to send the read instruction to one hard disk.

In S505, a network interface card 301 indicates the corresponding hard disk to read the to-be-read data. Further, a network interface card 301a writes the first read instruction into a hard disk receiving queue of the corresponding hard disk by using the identifier of the hard disk. Alternatively, a network interface card 301a generates a first read command after obtaining information about the storage object, and writes the first read command into a corresponding hard disk receiving queue. The first read command is different from the first read instruction, but includes partial information in the first read instruction. The partial information includes but is not limited to the access address of the storage object. The hard disk 0 reads the to-be-read data based on the access address of the storage object. The hard disk in this embodiment has a read/write interface for the storage object, and can understand semantics of the storage object. Therefore, the to-be-read data can be read based on the access address of the storage object.

After completing the read operation, the hard disk may include the to-be-read data in a response message, and send the response message to a network interface card sending queue of the network interface card 301a. The network interface card 301a obtains the response message from the network interface card sending queue, and parses out the to-be-read data.

In S506, the network interface card 301 sends the to-be-read data to the client 102.

According to the method for executing a data read request shown in FIG. 6, only three data interactions are performed in a process from sending the data read request by the client to receiving the to-be-read data, thereby greatly saving network resources. In another known data read process, after querying the metadata management module for the metadata (the metadata mainly includes the access address of the storage object corresponding to the to-be-read data) of the to-be-read data, the computing node 20a feeds back the metadata of the to-be-read data to the client 102. The client 102 determines, based on the metadata, that the to-be-read data is located on the storage node 30a. The client 102 sends a read instruction to the storage node 30a to read the data. It is clear that, in this manner, the client can obtain the to-be-read data only after four data interactions are performed. Therefore, the method for executing a data read request shown in FIG. 5 is more efficient, and more network resources are saved.

A person of ordinary skill in the art understands that each aspect of the present disclosure or a possible implementation of the aspect may be further implemented as a system, a method, or a computer program product. Therefore, each aspect of the present disclosure or the possible implementation of each aspect may use forms of hardware only embodiments, software only embodiments (including firmware, resident software, and the like), or embodiments with a combination of software and hardware, which are collectively referred to as a "circuit", "module", or "system" herein. In addition, each aspect of the present disclosure or the possible implementation of each aspect may use a form of a computer program product, where the computer program product refers to computer-readable program code stored in a computer-readable medium.

The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable ROM (EPROM), and an optical disc.

A processor in a computer reads the computer-readable program code stored in the computer-readable medium, so that the processor can perform each step or a functional action specified in a combination of steps in the flowchart.

All of the computer-readable program code may be executed on a user computer, a part of the computer-readable program code may be executed on a user computer as a standalone software package, a part of the computer-readable program code may be executed on a user computer and a part of the computer-readable program code is executed on a remote computer, or all of the computer-readable program code may be executed on a remote computer or a server. It should also be noted that, in some alternative implementation solutions, the steps in the flowcharts or functions specified in the erase blocks in the block diagrams may not occur in the order shown in the figures. For example, two consecutive steps or two consecutive erase blocks shown in the figure, which are dependent on an involved function, may be actually executed substantially at the same time, or these erase blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

What is claimed is:

1. A storage system, comprising:
   a client configured to:
      send a data write request comprising data related to an application; and
      send a first write instruction comprising a log of the data and a first access address of a first storage object allocated to the log, wherein the first access address of the first storage object comprises a first identifier of the first storage object and a first offset of the first storage object;
   a computing node coupled to the client and comprising a memory, wherein the computing node is configured to:
      pre-allocate the first storage object to the client;
      send the first access address of the first storage object to the client;
      receive, from the client, the data write request;
      write the data into the memory; and
      send, to the client, a first response message after writing the data into the memory; and
   a storage node coupled to the computing node and the client and comprising a hard disk, wherein the storage node is configured to:
      receive, from the client, the first write instruction; and
      forward the log and the first access address to the hard disk,
   wherein the hard disk comprises an object semantic interface and is configured to write, based on the first access address, the log into a first storage space corresponding to the first storage object without performing address translation, wherein the computing node is further configured to write at least a part of the data in the memory when a total amount of the data in the memory reaches a threshold, wherein the storage node is further configured to send, to the client and in response to the log being written onto the hard disk, a second response message to the client, wherein the client is further configured to:
receive the first response message and the second response message; and
feed back, to the application in response to receiving the first response message and the second response message, an indication that the data has been stored successfully, wherein the computing node is further configured to:
allocate a second storage object to the data; and
send, to the storage node, a second write instruction comprising the data and a second access address of the second storage object, wherein the second access address comprises a second identifier of the second storage object and a second offset of the second storage object, wherein the storage node is further configured to:
receive the second write instruction; and
forward the data and the second access address to the hard disk, wherein the hard disk is further configured to write, based on the second access address, the data into a second storage space corresponding to the second storage object, and wherein the storage node is further configured to delete the log from the first storage space in response to the hard disk writing the data into the second storage space.

2. The storage system of claim 1, wherein the first write instruction further comprises an identifier of the hard disk.

3. The storage system of claim 1, wherein the first offset indicates a location in the first storage object.

4. The storage system of claim 1, wherein the log further comprises a corresponding operation type, and wherein the corresponding operation type comprises a write instruction.

5. The storage system of claim 1, wherein the log further comprises a corresponding operation type, and wherein the corresponding operation type comprises a read instruction.

6. The storage system of claim 1, wherein the log comprises a time at which the data is received.

7. The storage system of claim 1, wherein the data write request further comprises an address of the data.

8. A storage node, comprising:
a hard disk; and
a network interface card coupled to the hard disk and configured to:
receive, from a client, a data write request comprising data related to an application;
receive, from the client, a first write instruction comprising a log of the data and a first access address of a first storage object allocated to the log, wherein the first access address of the first storage object comprises a first identifier of the first storage object and a first offset of the first storage object, wherein the log further comprises a corresponding operation type, and wherein the corresponding operation type comprises a write instruction or a read instruction; and forward the log and the first access address to the hard disk, wherein the first access address is located on the hard disk, wherein the hard disk comprises an object semantic interface and is configured to write, based on the first access address, the log into a first storage space corresponding to the first storage object without performing address translation, wherein the storage node is coupled to a computing node for enabling the computing node to:
receive, from the client, the data write request;
write the data into the memory; and
send, to the client and in response to the data being written onto the memory, a first response message to the client, and wherein the storage node is further configured to send, to the client and in response to the log being written onto the hard disk, a second response message to the client, and enables the client to receive the first response message and the second response message and to feed back, to the application in response to receiving the first response message and the second response message, an indication that the data has been stored in successfully, wherein the network interface card is further configured to:
receive a second write instruction comprising the data and a second access address of a second storage object allocated to the data, wherein the second access address comprises a second identifier of the second storage object and a second offset of the second storage object; and
forward the data and the second access address to the hard disk, wherein the hard disk is further configured to write, based on the second access address, the data into a second storage space corresponding to the second storage object, and wherein storage node is further configured to delete the log from the first storage space in response to the hard disk writing the data into the second storage space.

9. The storage node of claim 8, wherein each of the first access address and the second access address further comprises a second identifier of the hard disk, and wherein the network interface card is further configured to determine the hard disk based on the second identifier.

10. The storage node of claim 8, wherein the offset indicates a location in the second storage object.

11. The storage node of claim 8, wherein the log comprises a time at which the first data is receive or a corresponding operation type.

12. The storage node of claim 8, wherein the data write request further comprises an address of the data.

13. A method comprising:
sending, by a client of a storage system, a data write request comprising data related to an application;
sending, by the client, a first write instruction comprising a log of the data and a first access address of a first storage object allocated to the log, wherein the first access address comprises a first identifier of the first storage object and a first offset of the first storage object;
pre-allocating, by a computing node of the storage system, the first storage object to the log;
sending, by the computing node, the first access address to the client;
receiving, by the computing node, the data write request from the client;

writing, by the computing node, the data into a memory of the computing node;

sending, by the computing node, a first response message to the client after writing the data into the memory;

receiving, by a storage node of the storage system, a first write instruction from the client;

forwarding, by the storage node, the log and the first access address to a hard disk of the storage node, wherein the hard disk comprises an object semantic interface;

writing, by the hard disk based on the first access address, the log into a first storage space corresponding to the first access address without performing address translation;

writing, by the computing node, at least a part of the data in the memory when a total amount of the data in the memory reaches a threshold;

sending, by the storage node and in response to the log being written onto the hard disk, a second response message to the client;

receiving, by the client, the first response message and the second response message;

feeding back, by the client to the application and in response to receiving the first response message and the second response message, an indication that the data has been stored in successfully;

allocating, by the computing node, a second storage object to the data;

sending, by the computing node, a second write instruction to the storage node, wherein the second write instruction comprises the data and a second access address of the second storage object, and wherein the second access address comprises a second identifier of the second storage object and a second offset of the second storage object;

receiving, by the storage node, the second write instruction;

forwarding, by the storage node, the data and the second access address to the hard disk;

writing, by the hard disk based on the second access address, the data into a second storage space corresponding to the second storage object; and deleting, by the storage node, the log from the first storage space in response to the hard disk writing the data into the second storage space.

14. The method of claim 13, wherein the first write instruction further comprises an identifier of the hard disk.

15. The method of claim 13, wherein the first offset indicates a location in the first storage object.

16. The method of claim 13, wherein the log further comprises a corresponding operation type, and wherein the corresponding operation type comprises a write instruction.

17. The method of claim 13, wherein the log further comprises a corresponding operation type, and wherein the corresponding operation type comprises a read instruction.

18. The method of claim 13, further comprising executing the data write request in a write-ahead logging (WAL) manner.

19. The method of claim 13, wherein the log comprises a time at which the data is received or a corresponding operation type.

20. The method of claim 13, wherein the data write request further comprises an address of the data.

* * * * *